US008863122B2

(12) United States Patent
Bouchier et al.

(10) Patent No.: US 8,863,122 B2
(45) Date of Patent: Oct. 14, 2014

(54) REMOTE CONTROL OF A PLURALITY OF VIRTUAL MACHINES USING ACTIONS FACILITATED THROUGH A GRAPHIC USER INTERFACE

(75) Inventors: Paul Bouchier, Little Elm, TX (US); Scott E. Garee, McKinney, TX (US); Bryan J. Jacquot, Mitchell, SD (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 83 days.

(21) Appl. No.: 13/383,506

(22) PCT Filed: Jul. 31, 2009

(86) PCT No.: PCT/US2009/052435
§ 371 (c)(1),
(2), (4) Date: Jan. 11, 2012

(87) PCT Pub. No.: WO2011/014189
PCT Pub. Date: Feb. 3, 2011

(65) Prior Publication Data
US 2012/0124580 A1 May 17, 2012

(51) Int. Cl.
*G06F 9/46* (2006.01)
*G06F 15/16* (2006.01)
*G06F 15/177* (2006.01)
*G06F 3/00* (2006.01)
*G06F 9/48* (2006.01)

(52) U.S. Cl.
CPC .................................. *G06F 9/4843* (2013.01)
USPC ............... 718/1; 709/208; 715/734; 715/735; 715/740

(58) Field of Classification Search
None
See application file for complete search history.

(56) References Cited

U.S. PATENT DOCUMENTS

| 2004/0230970 A1 | 11/2004 | Janzen |
| 2005/0240685 A1 | 10/2005 | Keys |
| 2006/0190532 A1 | 8/2006 | Chadalavada |
| 2007/0174410 A1* | 7/2007 | Croft et al. ..................... 709/208 |

FOREIGN PATENT DOCUMENTS

| CN | 1305611 | 7/2001 |
| CN | 101410803 | 4/2009 |
| CN | 101425021 | 5/2009 |
| CN | 101437001 | 5/2009 |

OTHER PUBLICATIONS

International Search Report and Written Opinion, International Searching Authority, 12 pages, Jul. 31, 2009.
Chinese Office Action dated Nov. 11, 2013 cited in Appl. No. 200980160725.4.
Introducing Microsoft Virtual Server 2005 on IBM Eserver Xseries Servers, Internet Citation, Nov. 2004, XP002427004, Retrieved from the internet: URL: redbooks.ibm.com/redpapers/pdfs/redp3912.pdf, abstract, p. 6, paragraph 1.2-p. 10, paragraph 1.3.
Richardson et al: "Virtual Network Computing", IEEE Internet Computing, IEEE Service Center, New York, NY Institute of Electronics Engineers, US, vol. 2, No. 1, Jan. 1, 1998, pp. 33-38, XP002142727, ISSN: 1089-7801, DOI: 10.1109/4236.656066, the whole document.

* cited by examiner

*Primary Examiner* — Meng An
*Assistant Examiner* — Bing Zhao

(57) ABSTRACT

A system is operatively coupled to a remote computer via a network. The system comprises service processing logic and a server executing a virtual machine. The service processing logic controls the virtual machine as directed by the remote computer.

12 Claims, 6 Drawing Sheets

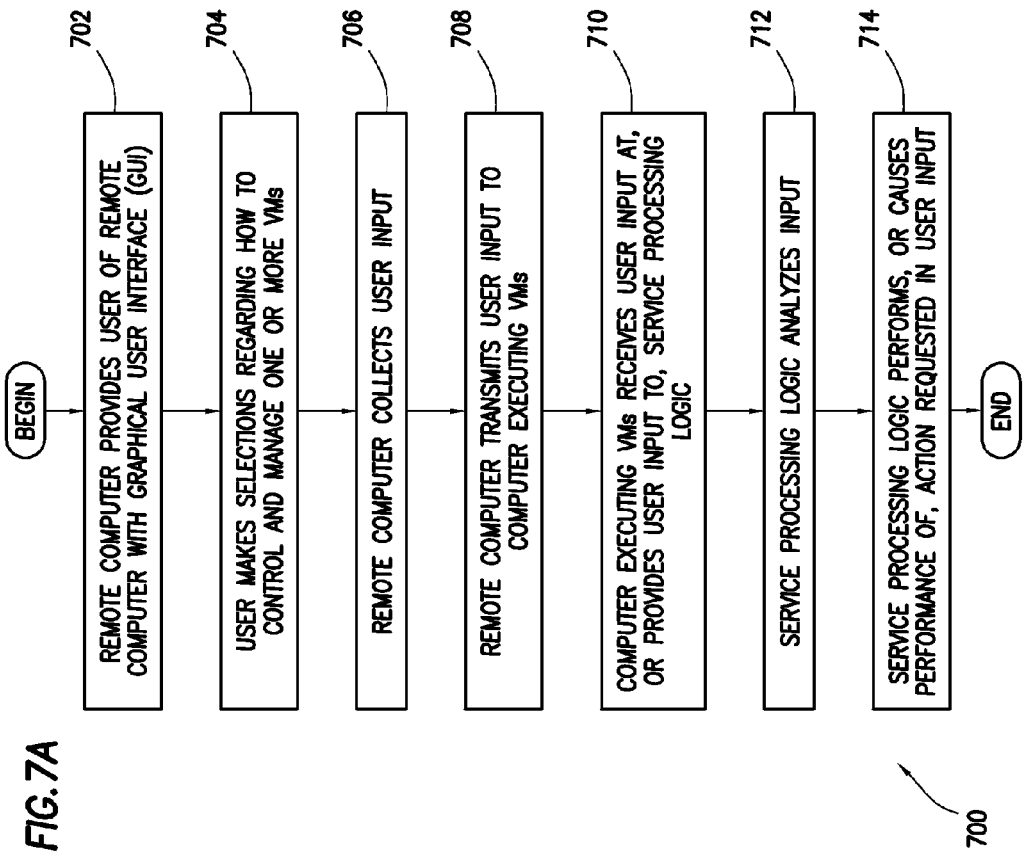

REMOTE CONTROL OF A PLURALITY OF VIRTUAL MACHINES USING ACTIONS FACILITATED THROUGH A GRAPHIC USER INTERFACE

BACKGROUND

A virtual machine generally is defined as software that is capable of acting as an analogous hardware device would act. For example, a virtual server, which is composed of software, can perform various actions and respond to external stimuli much as a hardware server would, thereby simulating a hardware server. Because they are composed of software, virtual machines are stored in memory (e.g., hard drives, random access memory (RAM)) and are executed by processors, just as with any other type of software. Accordingly, a single computer may comprise memory that stores any number of virtual machines. Different virtual machines are designed by different entities and, as a result, often have different interfaces.

BRIEF DESCRIPTION OF THE DRAWINGS

For a detailed description of exemplary embodiments of the invention, reference will now be made to the accompanying drawings in which:

FIGS. 7A-7B show flow diagrams of illustrative methods implemented in accordance with various embodiments.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. A connection may include both software and hardware components.

"Service processing logic" (e.g., a service processor) is a system or subsystem comprising a central processing unit (CPU), associated storage (e.g., memory) and/or other hardware running software and/or firmware that provides a user connected to the service processing logic with the ability to control and manage one or more servers or hardware partitions to which the service processing logic couples. The Hewlett-Packard® iLO® or Onboard Administrator are illustrative of such service processing logic.

Finally, a "virtual machine" comprises software that acts, or causes a processor to act, like a hardware machine that the VM is intended to emulate. Stated in another way, a virtual machine comprises software that mimics the behavior of hardware.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Disclosed herein are systems and methods in which a single, universal interface enables a network administrator to remotely control multiple virtual machines. The interface enables users to power on, power off, restart and perform various other actions on each virtual machine. The user is enabled in this way by integrating virtual machines (VMs) with service processing logic stored on the same hardware device as the VMs. By integrating service processing logic with the VMs, a service processing logic may be used to control the VMs.

Figure 1:
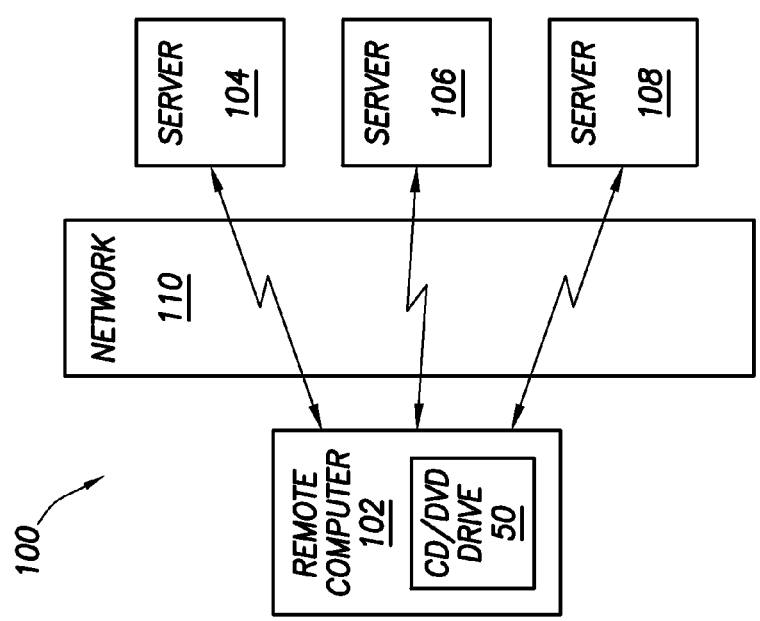
FIG. 1 shows a block diagram of an illustrative system in accordance with various embodiments.

FIG. 1 shows a block diagram of an illustrative system 100 in accordance with embodiments. As shown, the system 100 comprises a remote computer 102 that communicates with multiple hardware servers 104, 106, 108 via a network 110. The network 110 may include both wired and wireless connections. The remote computer 102 may comprise any type of computer, such as a desktop, a notebook, a server, a handheld device, etc. Although the remote computer 102 is described as communicating with multiple servers 104, 106, 108 via the network 110, in at least some embodiments, one or more of the multiple servers may be replaced with different types of computers, such as those listed above.

Figure 2:
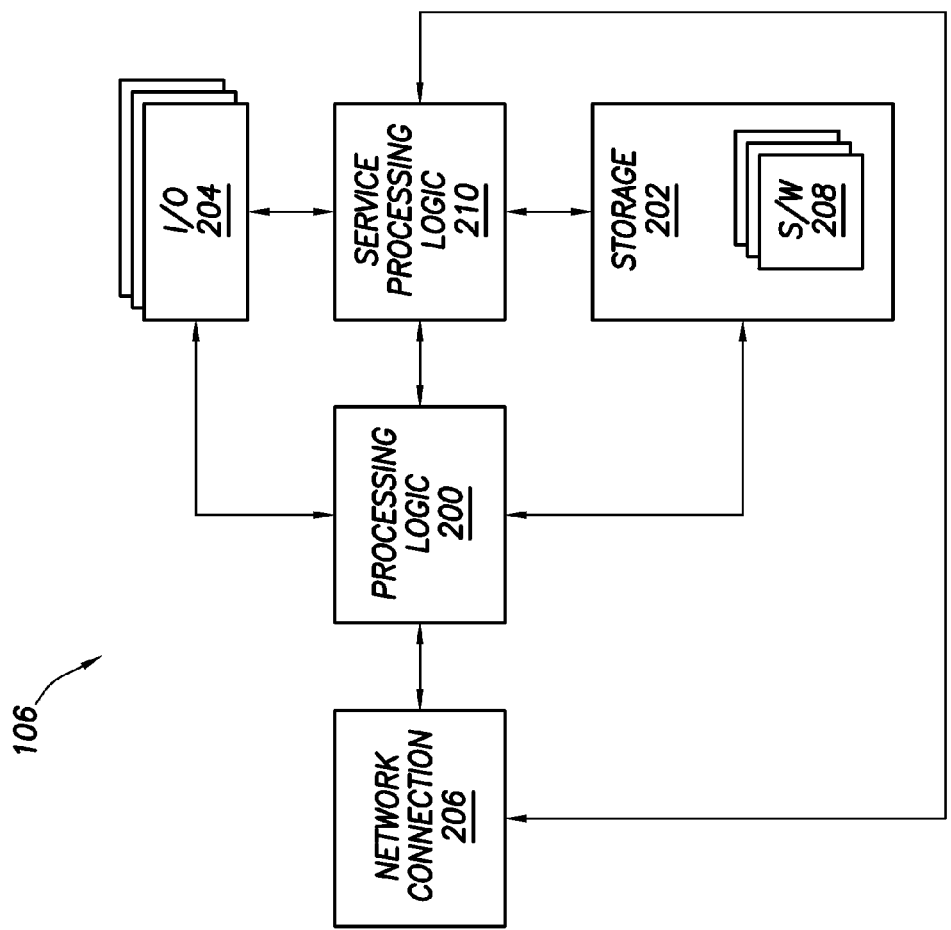
FIG. 2 shows a block diagram of an illustrative hardware server, in accordance with various embodiments.

FIG. 2 shows a detailed view of an illustrative server 106. The components shown in FIG. 2 are representative of most types of computers that may communicate with the remote computer 102 via the network 110. Thus, the components shown in FIG. 2 also may be found in one or more of the servers 104 and 108, or in other types of computers that are substituted for one or more of the servers 104, 106, 108.

The server 106 (also known as a "host computer") comprises processing logic 200, such as a central processing unit (CPU). The server 106 also comprises storage 202 (e.g., a hard drive, random access memory (RAM), or other suitable storage), input and output devices 204, and a network connection 206 via which the server 106 communicates with the network 110. The storage 202, in turn, comprises multiple instances of software 208. At least some of the instances of software 208 include VMs. In at least some embodiments, the VMs are different from each other, each VM providing a different interface usable to interact with and control that VM. The software 208 also may include one or more operating systems, at least one of which comprises a VM host operating system usable to execute and operate the VMs. In some embodiments, a partition is equivalent to a server. The term "server" should be understood to apply to partitions and similar server-related computing hardware.

The server 106 still further comprises service processing logic 210. Service processing logic 210 generally may be defined as a processor, possibly located on the same system board as the processing logic 200, that is capable of controlling the server 106. Stated in another way, the service processing logic 210 enables other computers (e.g., remote computer 102) to remotely control the server 106. As described below, embodiments disclosed herein leverage the service processing logic 210 to control not just the server 106 itself, but also to control the software VMs which execute on processing logic 200. In at least some embodiments, the service processing logic 210 comprises Hewlett-Packard Company's® Integrated Lights-Out® (iLO) service processor, or Onboard Administrator.

In some embodiments, the service processing logic 210 comprises an autonomous management subsystem chat resides in the server 106 to manage the server 106 through any server state: initial power-on testing; prior to loading of the operating system (OS); while the OS is functional; and even after OS failure. In at least some embodiments, the service processing logic 210 includes its own processor, memory subsystem and network controller, none of which are specifically shown in FIG. 2. The service processing logic 210 provides a remote administrator (e.g., using the remote computer 102 from any location in the world) with a graphical remote console that imitates the graphical console the administrator would view if s/he were controlling the server 106 locally. The service processing logic 210 enables the remote administrator to view and operate the graphical remote console using any operating system and virtual "buttons" that may be used to power on or off the actual hardware of the server 106 itself. The service processing logic may provide a textual user interface that provides capabilities similar to those provided by the virtual buttons.

Figure 3:
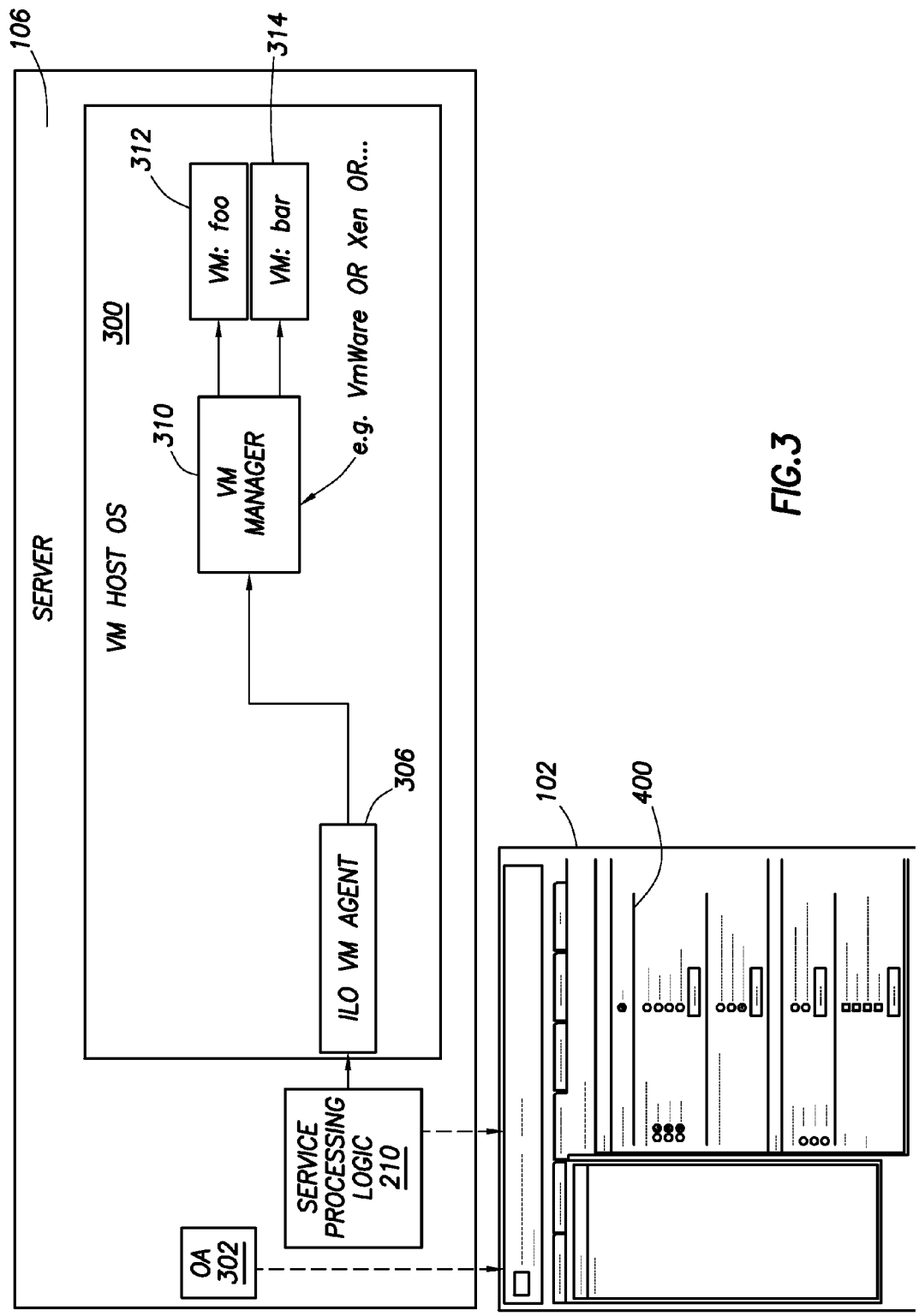
FIG. 3 shows a conceptual block diagram of an illustrative virtual machine software architecture, in accordance with various embodiments.

FIG. 3 shows a block diagram of an illustrative virtual machine software architecture in accordance with various embodiments. As shown in FIG. 3, the server 106 comprises a VM host OS 300. Within the VM host OS 300 environment operate multiple VMs 312, 314. Although only two VMs are shown in FIG. 3, any number of VMs may be used. A VM manager 310 also operates within the VM host OS 300 environment. The VM manager 310 manages/controls multiple VMs 312, 314. Examples of VM managers include VM management software included with VM software such as VmWare®, Xen®, etc. In at least some embodiments, VM managers are controlled from a server GUI or using external management software. In preferred embodiments, the VM manager 310 is controlled by a service processing logic VM management agent 306 of the service processing logic 210.

The service processing logic 210 communicates with the remote computer 102 via the network 110 (shown in FIG. 1). As previously explained, the service processing logic 210 enables network administrators using the remote computer 102 to control the server 106. Accordingly, the service processing logic 210 provides video data to the remote computer 102 which the remote computer 102 uses to generate graphical user interfaces (GUIs) on a display coupled to the remote computer 102. This video data represents the same video data that would be used to generate a GUI on a display coupled to the server 106. Stated in another way, the service processing logic 210 generates on the display of the remote computer 102 the same GUIs that would be generated on a display of the server 106. The service processing logic 210 generates GUIs in this way so that an administrator using the remote computer 102 can control the server 106 as if the administrator was sitting in front of the server 106 and working on the server 106 directly.

Unlike other remote management systems, the embodiments disclosed herein enable a remote user to use the GUIs to control not only the physical hardware of the server 106, but also the VMs 312, 314. The disclosed embodiments facilitate this functionality because the service processing logic 210 communicates with the agent 306, because the agent 306 controls the VM manager 310, and because the VM manager 310 controls the VMs 312, 314. Thus, the interfacing between the service processing logic 210 and the agent 306 enables GUIs generated by the service processing logic 210 to be usable to control the VMs 312, 314.

The preceding description has shown how one service processing logic 210 can control multiple VMs on a single server 106. In other embodiments, multiple servers 106 may be managed by a single service processing logic 210, which would thereby control multiple VMs on multiple servers. In some embodiments there may be a higher-level service processing logic, such as onboard administrator 302 (FIG. 3), which may generate GUIs instead of processing logic 210, and which may act as a proxy for multiple lower level service processing logics 210.

Figure 4:
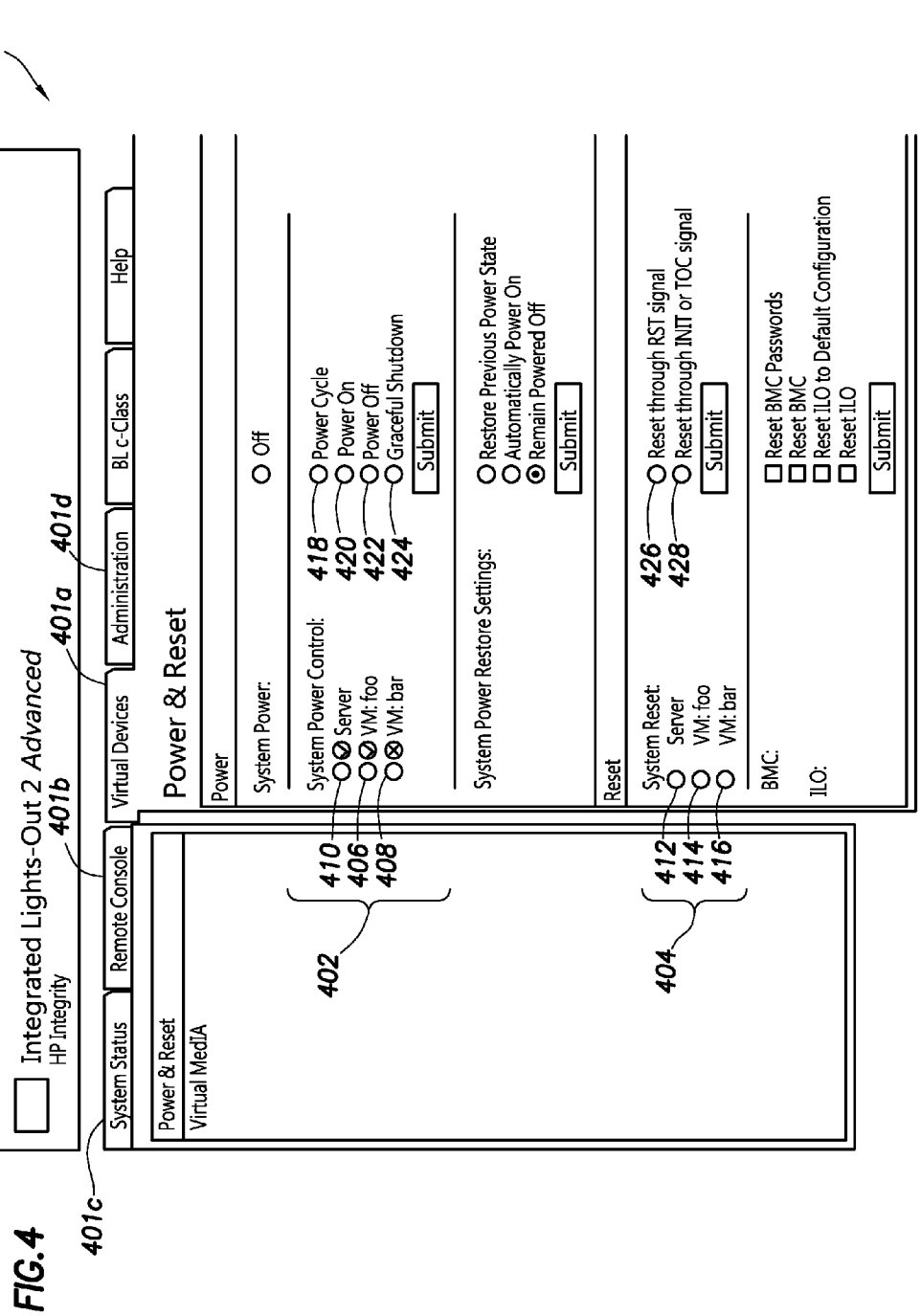
FIG. 4 shows a first illustrative user interface, in accordance with various embodiments.

FIG. 4 shows an illustrative GUI 400 that may be displayed on a display of the remote computer 102. The GUI 400 provides a user of the remote computer 102 with various options by which to control the server 106 and/or the VMs 312, 314. The GUI 400 includes a "Virtual Devices" tab 401a as well as various other possible tabs (e.g., a "Remote Console" tab 401b, a "System Status" tab 401c and an "Administration" tab 401d). Clicking the Virtual Devices tab 401a enables the user to view a Power & Reset options screen, as shown. Under the "Power" section, the GUI 400 enables the user to choose from multiple system power control options 402. Specifically, the user may choose to perform an action on the server 106 by clicking on the radio button 410. Alternatively or in addition, the user may choose to perform an action on the VM 312 by clicking on the radio button 406. Alternatively or in addition, the user may choose to perform an action on the VM 314 by clicking on the radio button 408. Whereas other systems that do not implement the techniques disclosed herein would not be able to provide the user with the option of performing a task on the VM 312 (radio button 406) or the VM 314 (radio button 408), the present system is able to do so because the service processing logic 210 controls the VMs 312, 314 as described above and as shown in FIG. 3. The actions that may be performed on a VM is not limited to those shown in any of the figures.

Once one or more of the server 106, VM 312 or VM 314 have been selected, an operation may be selected for performance thereupon. Such operations may include performing a power cycle (radio button 418), powering on the selected machine (radio button 420), powering off the selected machine (radio button 422) and performing a graceful shutdown of the selected machine (radio button 424). Other options also may be available on the GUI 400.

For instance, a user may select radio buttons 408 and 422 and click "Submit," thereby causing the remote computer 102 to instruct the service processing logic 210 to "power off" the VM 314. Because the VM 314 comprises software, the VM 314 is not actually shut down in the same sense that a hardware device is shut down. Instead, the server 106 "shuts down" the VM 314 by ceasing execution of the software that constitutes the VM 314. This functionality, which is unavailable without using embodiments disclosed herein, is accessible to users of the remote computer 102 because the service processing logic 210 interfaces with the VMs 312, 314 via the agent 306 and VM manager 310.

Similarly, the GUI 400 may enable reset of the server 106 and/or VMs 312, 314 using the radio buttons 404. The server 106 may be selected for an operation by clicking on radio button 412. The VM 312 may be selected for an operation by clicking on radio button 414. The VM 314 may be selected for an operation by clicking on radio button 416. After selecting one or more of the server 106 and/or VMs 312, 314, an operation may be selected for performance thereupon using radio buttons 426, 428.

When a user using the GUI 400 selects the server 106 and an operation to be performed on the server 106, the remote computer 102 collects the user input and transmits it to the server 106 via the network 110. The server 106, upon receiving the user input, provides the user input to the service processing logic 210. The service processing logic 210 interprets the user input and routes it as necessary. In this case, an action is being performed on the hardware of the server 106 itself. Thus, the service processing logic 210 carries out that action on the server 106. If the user input a request that the server 106 be powered off, for example, the service processing logic 210 powers off the server 106.

When a user using the GUI 400 selects one of the VMs 312, 314 and an operation to be performed on that VM 312, 314, the remote computer 102 collects the user input and transmits it to the server 106 via the network 110. The server 106, upon receiving the user input, provides the user input to the service processing logic 210. The service processing logic 210, in turn, interprets the user input data and routes it as necessary. In this case, an action is being performed on one or more of the VMs 312, 314. If, for instance, the user input requests that the VM 314 be reset, the service processing logic 210 causes execution of the VM 314 to halt and resets the program counter, thereby simulating the re-boot of a hardware server.

Figure 5:
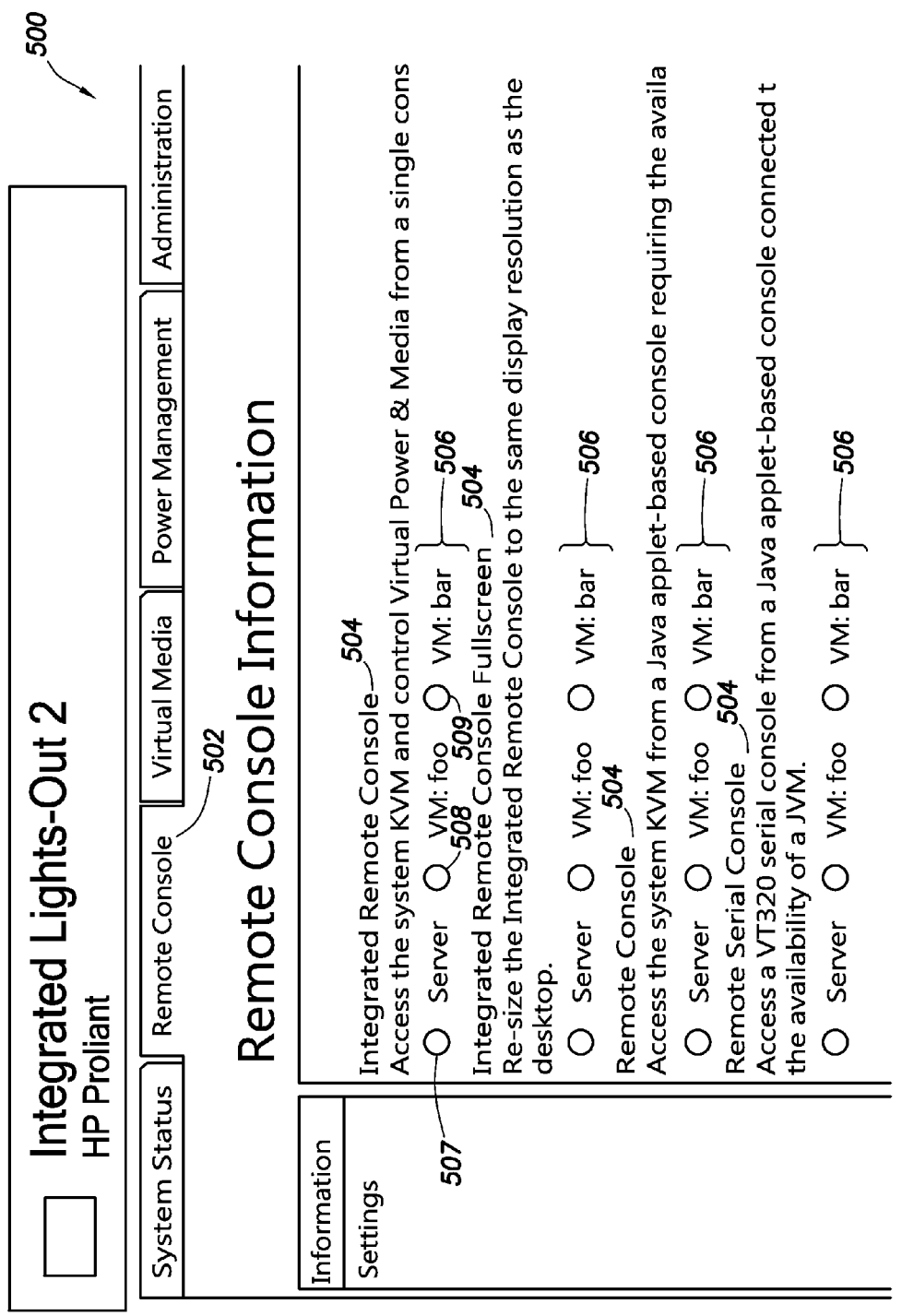
FIG. 5 shows a second illustrative user interface, in accordance with various embodiments.

FIG. 5 shows another illustrative GUI 500. The interface shown in FIG. 5 is presented to a user of the remote computer 102 when the user selects the Remote Console tab 502. Shown on the GUI 500 are various remote console options 504. These options 504 enable the user to customize how s/he views the remote console on a display coupled to the remote computer 102. Each option 504 is associated with multiple radio buttons 506. The radio buttons enable the user to specify to which hardware or software device the user wants the particular option 504 to apply. As shown, the radio buttons 506 include VMs 312, 314 in addition to the server 106. When a user using GUI 500 selects one of the VMs 312, 314 or server 106 using radio buttons 507, 508, 509 and clicks an option 504, the user is presented with the console for the selected VM or the server. While other systems not employing the embodiments disclosed herein would be unable to present the VMs 312, 314 as possible targets of the remote console options 504 shown, the disclosed embodiments are able to do so because the service processing logic 210 controls the VMs 312, 314 via the agent 306 and the VM manager 310.

As shown in FIGS. 4 and 5, a user (e.g., network administrator) of the remote computer 102 may interact with one or more GUIs to control and manage not only the hardware server 106, but also the software VMs 312, 314. When the user takes some action using the GUI, the remote computer 102 collects the user input data and transmits it to the service processing logic 210. The service processing logic 210, in turn, commands the VMs 312, 314 to perform the user-requested action, or performs the user-requested action on the VMs 312, 314. The service processing logic 210 interacts with the VMs 312, 314 in this manner via the agent 306 and the VM manager 310. In particular, the agent 306 may be considered a software agent of the service processing logic 210 dedicated to interacting with the VM manager 310. The VM manager 310 may be a separate instance of software that is dedicated to managing a plurality of VMs resident on the server 106. In some embodiments, the agent 306 and the VM manager 310 may be integrated into a single instance of software. However, as a matter of logistics (e.g., software licensing, software installation, different software manufacturers), in some embodiments, the agent 306 and the VM manager 310 may remain separate instances of software that interact with each other, as shown.

Figure 6:
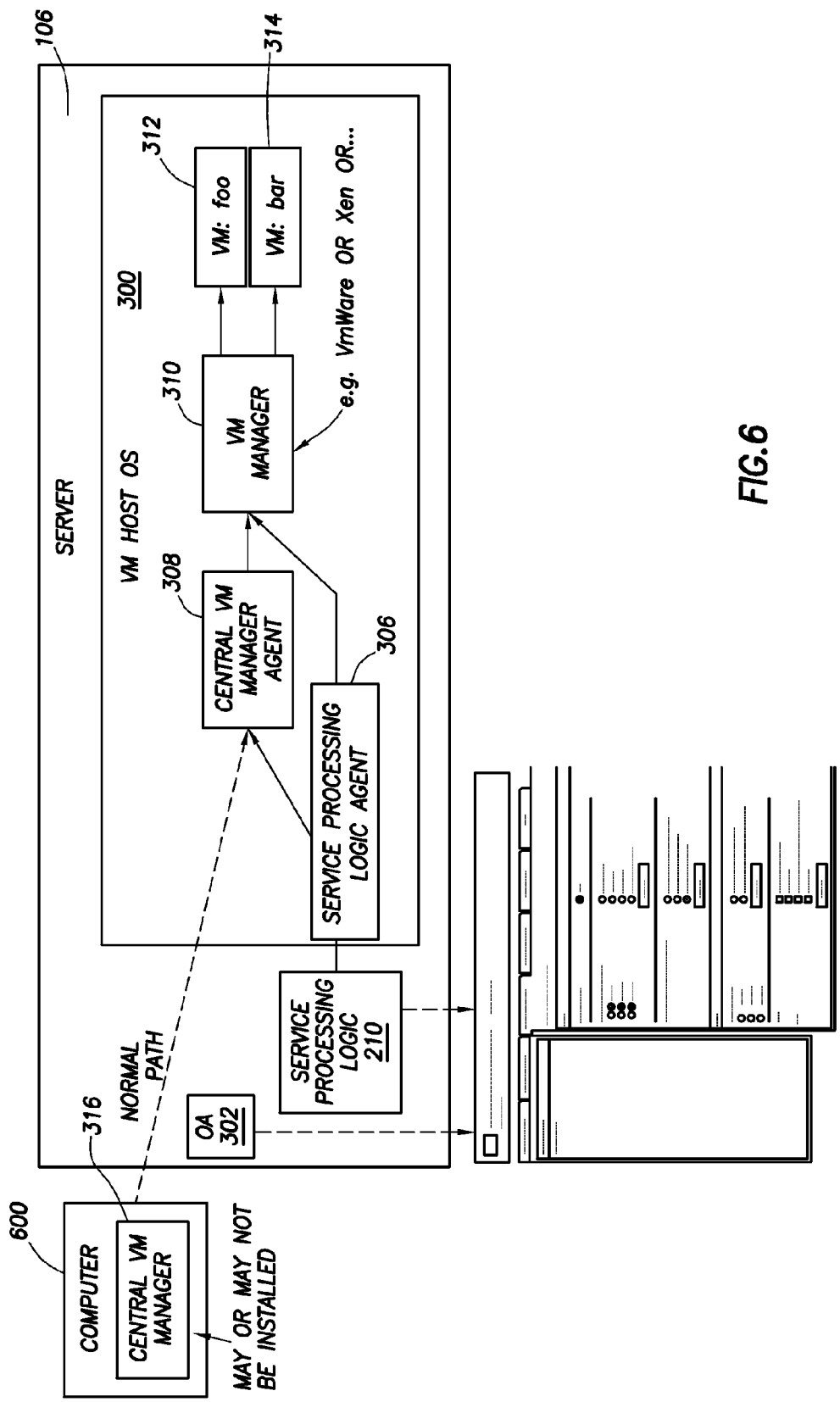
FIG. 6 shows another block diagram of an illustrative virtual machine software architecture, in accordance with embodiments.

One such embodiment is shown in FIG. 6. The software architecture shown in FIG. 6 is similar to that shown in FIG. 3. However, the architecture shown in FIG. 6 comprises additional software components: a central VM manager agent 308 and a central VM manager 316. The central VM manager agent 308 comprises software resident on the server 106 that is executed within the VM host OS 300 environment. The VSE manager 316 comprises software that is stored on a computer 600 separate from, but in communication with, the server 106. In addition to managing the VM manager 310, the central VM manager 316 also may manage VM managers on multiple servers. The central VM manager 316 may manage all the VMs in a datacenter. The central VM manager 316 manages each of the VM managers on the different servers by way of a central VM manager agent present on each of the servers, such as the central VM manager agent 308 present on server 106. In embodiments comprising a central VM manager(s) and a central VM manager agent(s), the agent 306 may communicate with the VM manager 310 either directly or via the central VM manager agent 308, as desired. In general, regardless of the precise software architecture implemented in any particular system, an embodiment of the present disclosure is realized when service processing logic manages and controls one or more VMs, thereby enabling a user of a remote computer to manage and control the one or more VMs.

In some embodiments, a proxy may be used in lieu of the service processing logic 210. More specifically, as shown, an onboard administrator (OA) 302 may be used. The OA 302 comprises logic generally used to control at least some portions of the server 106. Instead of the primary interaction between the server 106 and computer 102 occurring using the service processing logic 210, in these embodiments, the OA 302 acts in lieu of the service processing logic 210 by performing some or all of the actions attributed to the service processing logic 210 herein.

FIG. 7A shows a flow diagram of an illustrative method 700 that is in accordance with various embodiments. The method 700 begins with a remote computer providing a user of the remote computer (such as a network administrator) with a GUI (block 702). A non-GUI interface, such as a textual interface, may be provided in addition to or in lieu of a GUI. The GUI provides the user with multiple options with which the user may control and manage one or more virtual machines executed on a computer (e.g., a server) located remotely from the remote computer. The virtual machines may perform any function, such as that of a software-based server. The GUI may be provided via a web browser or some other suitable type of software.

The method 700 further comprises the user making selections, via the GUI, regarding how to control and manage one or more VMs (block 704). The remote computer collects the user input (block 706) and transmits the user input to the computer executing the VMs (block 708). The computer executing the VMs receives the user input at, or provides the user input to, service processing logic (block 710). The service processing logic analyzes the user input data and determines what action is to be performed on which VM (block 712). The action to be performed and the target VM on which the action is to be performed may be encoded into the user input data using any suitable technique, as long as the computer that hosts the VMs is able to decode the information.

The method 700 then comprises the service processing logic using the user input data to perform, or cause the performance of, the action requested by the user on the target VM (block 714). As explained above, the service processing logic manages and controls the VM(s) via some combination of the agent 306, the control VM manager agent 308 and the VM manager 310. The various steps of the method 700 may be performed in any suitable order. Steps may be added to or deleted from the method 700 as desired.

FIG. 7B shows a flowchart of an illustrative method 750 implemented in accordance with embodiments. The method 750 comprises loading a software-encoded medium into a peripheral device coupled to the remote computer (block 752). The method 750 then comprises the service processing logic mapping the peripheral device to the server (block 754). The VM to which the peripheral device is mapped may be automatically designated (e.g., by the server) or may be manually designated (e.g., by the remote computer user). The user may designate the VM using, for instance, a GUI displayed on the remote computer based on graphical data provided by the server. The method 750 further comprises applying software from the software-encoded medium to the target VM (block 756). Thus, for instance, in this way, software stored on a CD inserted into the remote computer may be loaded onto a target VM. The steps of method 750 may be performed in any suitable order. Steps may be added to Or deleted from the method 750 as desired.

As explained, it is possible for a remote computer user to control the server 106. In part, the user is able to control the server 106 using a remote console that is shown on a display of the remote computer 102. Specifically, the remote console shows a stream of video data that is the same video that would be displayed on a display of the server 106. Thus, the user of the remote computer 102 interacts with the server 106 as if s/he was actually sitting in front of the server 106 and interacting with it directly. In a similar way, video data generated by a VM 312, 314 can be displayed to a user of the remote computer 102, thereby enabling the user to more easily control the VM 312, 314.

More specifically, the user of the remote computer 102 may be provided with the option of viewing either the desktop (i.e., remote console) of the server 106 or the desktop of one of the VMs 312, 314. This option may be provided, in at least some embodiments, on a GUI displayed on the remote computer 102. If the user selects the desktop of the server 106, the service processing logic 210 causes the desktop video data generated by the server 106 to be transmitted to and displayed on the remote computer 102. Conversely, if the user opts to view the desktop of one of the VMs 312, 314, the VM manager 310 (or other suitable software) causes the video data generated by the target VM 312, 314 to be transmitted to the remote computer 102 in lieu of the video data generated by the server 106. This latter operation could be accomplished by service processing logic 210 sending a message to agent 306 to cause VM manager 310 to maximize its desktop on the server 106 desktop, and further by transmitting server 106 desktop video data (which is displaying the VM 312 desktop image) to computer 102. Other techniques also may be used.

In some embodiments, the service processing logic 210 may enable various hardware multimedia capabilities to be provided to server 106. More specifically, and merely as an example, the remote computer 102 comprises a hardware compact disc/digital video disc (CD/DVD) drive 50. The service processing logic 210 communicates with software on the remote computer 102, such as a Java® Applet, which can read from or write to drive 50. It further uses hardware and software to emulate, for example, a universal serial bus (USB) DVD drive coupled to a USB port on server 106 (not specifically shown) using known techniques. It thereby enables the server 106 to read data from and/or write data to a CD or DVD in the CD/DVD drive 50 by reading/writing the emulated drive in server 106. In this way, the service processing logic 210 "virtualizes" the CD/DVD drive 50 and enables the server 106 to transparently use the CD/DVD drive 50 as if the CD/DVD drive 50 was installed on the server 106 itself. This type of functionality may be used, for example, if a user of the remote computer 102 desires to install software from a CD onto the server 106. The user of the remote computer 102 would insert the CD into the CD/DVD drive 50 and then remotely cause the service processing logic 210 to emulate a USB DVD to server 106, which can read data from the virtual DVD, thereby installing the software onto the server 106.

The interface (including the agent 306, manager 310 and, in some cases, manager agents 308) between the service processing logic 210 and the VMs 312, 314 enables this "virtualization" functionality to be extended not only to the server 106, but also to the VMs 312, 314. For example, a user of the remote computer 102 may desire to install software from a CD onto the VM 312. As explained above, the service processing logic 210 is able to map the CD/DVD drive 50 to the server 106. Using known techniques, the VM 312 may gain direct access to server 106 peripherals. Specifically, the VM 312 may directly access the virtual DVD provided by service processing logic 210. This virtual DVD drive is, as previously described, an emulation provided by logic 210 and supported by the real drive 50. In some embodiments, only one VM 312, 314 may map itself to the virtualized CD/DVD drive at a time. In some embodiments, which VM 312, 314 maps to the virtualized CD/DVD drive may be controlled by the VM manager 310. In some embodiments, the mapping of VMs to the virtualized CD/DVD drive (and, by extension, the hardware CD/DVD drive 50) is controlled by the user of the remote computer 102 (using, e.g., a GUI).

By mapping the CD/DVD drive 50 to the server 106 to create a virtualized CD/DVD drive on the server 106, and further by mapping the virtualized CD/DVD drive to a VM 312, the VM 312 is given access to the contents of any CD or DVD that may be inserted into the CD/DVD drive 50 on the remote computer 102. Embodiments are not limited to CD/DVD drives, however, and any of a variety of peripherals coupled to the remote computer 102 may be mapped to any VM on the server 106.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A server computing system operatively coupled to a remote computer via a network, comprising:
service processing logic; and
a processing logic coupled to the service processing logic and executing a plurality of virtual machines;
wherein the service processing logic controls the virtual machines as directed by the remote computer;
wherein the service processing logic generates a first graphical user interface (GUI) to be transmitted to the remote computer, the first GUI to display a list of the plurality of virtual machines and to enable a user of the remote computer to select one of the virtual machines from the list and an action to be performed on the selected virtual machine, the selected action to be performed on the selected virtual machine independent of the other of the plurality of virtual machines;

wherein the service processing logic generates a second GUI to enable the user of the remote computer to select a virtual machine from the plurality of virtual machines to which a hardware peripheral device accessible to the remote computer is to be mapped; and wherein, in response to a command from the remote computer, the service processing logic causes the selected virtual machine to perform an action selected from the group consisting of starting the virtual machine, stopping the virtual machine, and re-booting the virtual machine.

2. The server computing system according to claim 1, further comprising a virtual machine manager, and wherein the service processing logic controls the virtual machine using the virtual machine manager.

3. The server computing system of claim 1, wherein the service processing logic collects video display data associated with the virtual machine and transmits the video display data to the remote computer for display on the remote computer.

4. The server computing system of claim 1, wherein the service processing logic virtualizes the hardware peripheral device of the remote computer and enables the virtual machine to access the virtualized peripheral device.

5. A non-transitory computer-readable medium comprising code which, when executed, causes hardware processing logic to:
  receive user-input data from a remote computer via a network;
  control a virtual machine using said data;
  generate a first graphical user interface (GUI) to be transmitted to the remote computer and to thereon display a list of a plurality of virtual machines and to enable a user of the remote computer to select one of the virtual machines from the list and an action to be performed on the selected virtual machine, the selected action to be performed on the selected virtual machine independent of the other of the plurality of virtual machines; and
  generates a second GUI to enable the user of the remote computer to select a virtual machine from the plurality of virtual machines to which a hardware peripheral device accessible to the remote computer is to be mapped;
  wherein, in response to said user-input data, the selected action includes at least one of power cycling the selected virtual machine, powering on the selected virtual machine, powering off or shutting down the selected virtual machine, and resetting the selected virtual machine.

6. The non-transitory computer-readable medium according to claim 5, wherein the hardware processing logic:
  transmits to the remote computer video data of a graphical user interface associated with a selected virtual machine; and
  transmits to said selected virtual machine user-input data entered into the remote computer in response to displaying said video data.

7. The non-transitory computer-readable medium of claim 5, wherein the hardware processing logic provides a service to the selected virtual machine, and wherein part of providing said service includes using the hardware peripheral device coupled to the remote computer.

8. The non-transitory computer-readable medium of claim 5, wherein said computer-readable medium is housed within a server.

9. The non-transitory computer-readable medium of claim 5 wherein the code, when executed, causes the hardware processing logic to generate a third GUI to be transmitted to the remote computer to enable the user of the remote computer to select for display on the remote computer a desktop of a server on which a selected virtual machine executes or a desktop of the selected virtual machine.

10. A method, comprising:
  providing a first graphical user interface (GIU) from a host computer to a remote computer, the first GUI displaying on the remote computer a list of a plurality of virtual machines and to enable a user of the remote computer to select one of the virtual machines from the list as well as an action to be performed on the selected virtual machine, the selected action to be performed on the selected virtual machine independent of the other of the plurality of virtual machines;
  receiving user input from the remote computer via the first GUI, the user input including a selection of a virtual machine and an action to be performed on the selected virtual machine;
  in accordance with the user input, performing the action using the host computer on the selected virtual machine; and
  generating a second GUI to enable the user of the remote computer to select a virtual machine from the plurality of virtual machines to which a hardware peripheral device accessible to the remote computer is to be mapped;
  wherein said action is selected from the group consisting of starting, stopping, re-booting and shutting down.

11. The method according to claim 10, further comprising providing images associated with a virtual machine from the host computer to the remote computer.

12. The method of claim 10, further comprising:
  loading a software-encoded medium into the hardware peripheral device coupled to the remote computer;
  service processing logic on the host computer mapping the peripheral device to the virtual machine; and
  applying software from the software-encoded medium to the virtual machine.

* * * * *

UNITED STATES PATENT AND TRADEMARK OFFICE
CERTIFICATE OF CORRECTION

PATENT NO. : 8,863,122 B2
APPLICATION NO. : 13/383506
DATED : October 14, 2014
INVENTOR(S) : Paul Bouchier et al.

Page 1 of 1

It is certified that error appears in the above-identified patent and that said Letters Patent is hereby corrected as shown below:

In the Claims

In column 10, line 23, in Claim 10, delete "(GIU)" and insert -- (GUI) --, therefor.

Signed and Sealed this
Seventh Day of April, 2015

Michelle K. Lee
*Director of the United States Patent and Trademark Office*